United States Patent

Bohlander et al.

Patent Number: 5,371,119
Date of Patent: Dec. 6, 1994

[54] PROCESS FOR THE PRODUCTION OF POLYETHER POLYAMINES

[75] Inventors: Ralf Bohlander, Duesseldorf; Guenter Uphues, Monheim; Uwe Ploog, Haan, all of Germany

[73] Assignee: Henkel Kommanditgesellschaft auf Aktien, Duesseldorf, Germany

[21] Appl. No.: 962,223

[22] PCT Filed: Jul. 17, 1991

[86] PCT No.: PCT/EP91/01336
§ 371 Date: Jan. 26, 1993
§ 102(e) Date: Jan. 26, 1993

[87] PCT Pub. No.: WO92/01729
PCT Pub. Date: Feb. 6, 1992

[30] Foreign Application Priority Data

Jul. 26, 1990 [JP] Japan ................ 2-01067

[51] Int. Cl.$^5$ ............... C08L 63/00; C08K 3/20
[52] U.S. Cl. ..................... 523/414; 523/417; 523/420; 528/405
[58] Field of Search .......... 523/414, 417, 420; 528/405

[56] References Cited

U.S. PATENT DOCUMENTS 4,178,434 12/1979 Langdon ............... 528/405
5,162,547 11/1992 Roth et al. ............ 549/516

FOREIGN PATENT DOCUMENTS 2160144 6/1973 France .
2164714 8/1973 France .
1619082 2/1970 Germany .
2246434 6/1975 Germany .
3413566 10/1985 Germany .
 533719 3/1973 Switzerland .
1431476 4/1976 United Kingdom .

Primary Examiner—John C. Bleutge
Assistant Examiner—D. Aylward
Attorney, Agent, or Firm—Ernest G. Szoke; Wayne C. Jaeschke; Henry E. Millson, Jr.

[57] ABSTRACT

A process for the preparation of polyether polyamines comprising the steps of
 A) reacting a polyol with an epihalohydrin in the presence of a catalyst;
 B) adding an at least equimolar quantity of an aqueous alkali metal hydroxide, based on the weight of catalyst, to the reaction mixture formed in step A);
 C) distilling volatile constituents from the reaction mixture from step B) at a temperature below about 150° C. and under a pressure below about $1.33 \times 10^4$ Pa.;
 D) filtering the reaction mixture remaining after step C) at a temperature in the range of from about 80° C. to about 100° C. to remove insoluble components thereof from the bishalohydrin reaction product; and
 E) reacting the bishalohydrin reaction product with ammonia and/or an amine in the presence of an alkaline catalyst to form a polyether polyamine.

15 Claims, No Drawings

PROCESS FOR THE PRODUCTION OF POLYETHER POLYAMINES

This invention relates to a process for the production of polyether polyamines.

Polyether polyamines are known compounds which are used, for example, as hair treatment agents or—according to DE 16 19 082 and DE 22 46 434 —as textile auxiliaries. Polyether polyamines are normally prepared in two stages. To this end, a polyol is reacted with epichlorohydrin in the presence of a catalyst and the bis-chlorohydrin ether obtained is then converted into the corresponding polyether polyamine by reaction with amine compounds in the presence of solvents and an alkali metal hydroxide.

The polyether polyamines produced by this method contain decomposition products of the catalyst, which can cause clouding or crystalline deposits in the polyether polyamine, and the toxicologically and ecologically unsafe compounds dioxane and epichlorohydrin.

The problem addressed by the present invention was to produce polyether polyamines which would not contain any catalyst decomposition products and which would be free from dioxane and epichlorohydrin.

Accordingly, the present invention relates to a process for the production of polyether polyamines by reaction of a polyol with an epihalohydrin in the presence of a catalyst and subsequent reaction with ammonia and/or aliphatic mono-, di- and/or polyamines, characterized in that, after the reaction with epihalohydrin and before the reaction with ammonia and/or amines, an at least equimolar quantity, based on the quantity of catalyst used, of an alkali metal hydroxide in the form of an aqueous solution is added to the reaction mixture, the volatile constituents are then removed from the reaction mixture by distillation at a temperature below 150° C. and under a pressure below $1.33 \times 10^4$ Pa and the reaction mixture is subsequently filtered at 80° to 100° C.

The removal of volatile constituents by distillation is preferably carried out at temperatures of 110° to 130° C. and under a pressure below $0.67 \times 10^4$ Pa. In a particularly preferred embodiment, the distillation is carried out in the presence of water. To this end, 0.2 to 10% by weight and preferably 0.5 to 5% by weight water, based on the weight of the reaction mixture, is added to the reaction mixture during distillation.

It can also be of advantage to add monoamines to the reaction mixture after the alkali metal hydroxide.

The reaction of a polyol with an epihalohydrin, preferably epichlorohydrin, is carried out in known manner at temperatures of 60° to 90° C. and preferably at temperatures of 65° to 75° C. in the presence of a catalyst, for example boron trifluoride diacetic acid $BF_3[O(C_2H_5)_2]_2$, aluminium trichloride or tin tetrachloride. Epichlorohydrin is used in quantities of preferably 0.9 to 1.3 mol, based on an OH function. Suitable polyols are, in particular, polyethylene glycols having average molecular weights of 200 to 2000 either on their own or in combination with polypropylene glycols having average molecular weights of 400 to 1000.

After the removal of volatile constituents by distillation and after the removal of decomposition products of the catalyst used, for example $Na_3BO_3$ or $Na_2[Sn(OH)_6]$, by filtration, the bischlorohydrin ethers obtained are reacted with ammonia and/or amine compounds in known manner at temperatures of 40° to 100° C. and preferably at temperatures of 60° to 90° C. in the presence of alkaline catalysts, for example alkali metal hydroxides, to form polyether polyamines. The reaction is terminated by addition of acids, for example acetic acid, lactic acid and/or hydrochloric acid. Examples of suitable aliphatic mono-, di- and/or polyamines are dodecyl amine, 2-ethylhexyl amine, coconut oil amine, tallow amine, stearyl amine, ethylenediamine, propylenediamine, hexamethylenediamine, diethylenetriamine, dipropylenetriamine, dihexaethylenetriamine, 1,2-dihydroxyethyl diaminoethane, piperazine, polyethylene imines having average molecular weights of 200 to 10,000, bis-(3,3-aminopropyl)-methyl amine, N,N-dimethylaminopropyl amine, N-stearyl propylenediamine and/or N-acylamidoamines obtainable by aminolysis of natural fats and/or oils or by amidation of fatty acids with di- and/or polyamines, for example reaction products of beef tallow with tetraethylene pentamine or stearic acid with diethylenetriamine or aminoethyl ethanolamine.

The polyether polyamines obtainable by the process according to the invention are distinguished by the fact that they contain hardly any dioxane and epichlorohydrin and no decomposition products of the catalysts used.

EXAMPLES

A. Preparation of bischlorohydrin ethers

A1. In an evacuable and heatable 2 $m^3$ enamelled reactor equipped with a stirrer and condensation attachment, a mixture of 1500 kg (2.5 kmol) polyethylene glycol having an average molecular weight of 600 and 36 kg (0.19 kmol) boron trifluoride diacetic acid as catalyst was reacted with 460 kg (5 kmol) epichlorohydrin for 2 hours at 75° C. The bischlorohydrin ether A1 was obtained after stirring for 30 minutes.

A2. The bischlorohydrin ether A2 was prepared under the same conditions as described in A1. The 36 kg boron trifluoride diacetic acid were replaced by 36 kg (0.14 kmol) tin tetrachloride.

B. Removal of the volatile constituents from the bischlorohydrin ethers prepared in accordance with A. and subsequent filtration B1. In an evacuable and heatable 500 l reactor equipped with a stirrer and condensation attachment, 11.9 kg 50% by weight sodium hydroxide were added to 345 kg bischlorohydrin ether A1, after which the volatile constituents were removed over a period of 2 hours by distillation at a temperature of 120° C. and under a pressure of $4 \times 10^3$ Pa. During distillation, 8 kg water were introduced into the bischlorohydrin ether through a submerged tube.

B2. The product obtained in accordance with B1 was filtered through a suction filter covered with a filter paper (2 $\mu$) at 90° C. 7 kg of a white filtration residue were separated off.

B3. In an evacuable and heatable 500 l reactor equipped with a stirrer and condensation attachment, 17.5 kg 50% by weight sodium hydroxide and 18.2 kg (0.07 kmol) stearyl amine were successively added to 340 kg bischlorohydrin ether A1. The volatile constituents were then removed in 3 hours by distillation as in B1. The product was then filtered as in B2, 16 kg filtration residue being separated off.

B4. In an evacuable and heatable 500 l reactor equipped with a stirrer and condensation attachment, 7.5 kg 50% by weight sodium hydroxide were added to 345 kg bischlorohydrin ether A2, after which the volatile constituents were removed in 2 hours by distillation at a temperature of 120° C. and under a pressure of $4 \times 10^3$ Pa.

B5. Under the conditions described in B4, sodium hydroxide was added to bis-chlorohydrin ether A2 and the volatile constituents were subsequently removed by distillation. During distillation, 8 kg water were introduced into the bischlorohydrin ether through a submerged tube. On completion of distillation, the product was filtered under the conditions described in B2.

B6. Under the conditions described in B3, 13 kg 50% by weight sodium hydroxide and 18.2 kg stearyl amine were successively added to 340 kg bischlorohydrin ether. The volatile constituents were then removed by distillation at a temperature of 120° C. and under a pressure of $4 \times 10^3$ Pa.

B7. The bischlorohydrin ether obtained in accordance with B6 was filtered under the conditions described in B2.

C. Reaction with amines

C1. In a 1 m³ stainless steel reactor, 18.2 kg molten stearyl amine, 14.5 kg diethylenetriamine (1.41 kmol) and a mixture of 28 kg 50% by weight sodium hydroxide in 470 kg water were successively added at 10 minute intervals to 330 kg of the bischlorohydrin ether distilled and filtered in accordance with B2. After stirring for 3 hours, the viscosity had undergone a distinct increase. The reaction was terminated by addition of 30 kg glacial acetic acid. A yellow 40% by weight polyether polyamine solution was obtained.

C2. Under the conditions described in C1, 14.5 kg diethylenetriamine and a mixture of 22 kg 50% by weight sodium hydroxide in 475 kg water were successively added to 338 kg of the bischlorohydrin ether distilled and filtered as in B3. A polyether polyamine was obtained in the form of a clear yellow 40% by weight solution.

C3. Under the conditions described in C2, diethylenetriamine and sodium hydroxide were added to 338 kg of the bischlorohydrin ether distilled as described in B6. Due to the precipitation of tin stone, an opaque 40% by weight polyether polyamine solution was obtained.

C4. The distilled bischlorohydrin ether used in C3 was replaced by the bischlorohydrin ether distilled and filtered as described in B7. A clear 50% by weight polyether polyamine solution was obtained.

The dioxane content, the epichlorohydrin content and the content of catalyst residue in the bischlorohydrin ethers and polyether polyamines produced are shown in Table 1.

TABLE 1

| Bischlorohydrin ether or polyether polyamine produced in accordance with Example | Content in ppm of | | |
|---|---|---|---|
| | Dioxane | Epichlorohydrin | Catalyst residue |
| A1 | 38,000 | 120 | B: 1000  F: 5500 |
| A2 | 22,000 | 380 | Sn: 810 |
| B1 | 5 | 0.5 | B: 980;  F: 5500 |
| B2 | 5 | 0.5 | B: 25;  F: 14 |
| B3 | 5 | 0.5 | B: 33;  F; 11 |
| B4 | 30 | 0.5 | Sn: 800 |
| B5 | 5 | 0.5 | Sn: 45 |
| B6 | 24 | 0.5 | Sn: 785 |
| B7 | 24 | 0.5 | Sn: 35 |
| C1 (Invention) | 3 | 0.5 | B: 10;  F: 6 |
| C2 (Invention) | 2 | 0.5 | B: 9;  F: 7 |
| C3 | 9 | 0.5 | Sn: 260 |
| C4 (Invention) | 8 | 0.5 | Sn: 10 |

We claim:
1. A process for the preparation of polyether polyamines comprising the steps of
   A) reacting a polyol with an epihalohydrin in the presence of a catalyst;
   B) adding an at least equimolar quantity of an aqueous alkali metal hydroxide, based on the weight of catalyst, to the reaction mixture formed in step A);
   C) distilling volatile constituents from the reaction mixture from step B) at a temperature below about 150° C. and under a pressure below about $1.33 \times 10^4$ Pa;
   D) filtering the reaction mixture remaining after step C) at a temperature in the range of from about 80° C. to about 100° C. to remove insoluble components thereof from the bishalohydrin reaction product; and
   E) reacting the bishalohydrin reaction product with ammonia and/or an amine in the presence of an alkaline catalyst to form a polyether polyamine.

2. The process of claim 1 wherein step C) is carried out at a temperature in the range of from about 110° C. to about 130° C. and under a pressure below about $0.67 \times 10^4$ Pa.

3. The process of claim 1 wherein step C) is carried out in the presence of from about 0.2 to about 10% by weight of water, based on the weight of the reaction mixture.

4. The process of claim 3 wherein the weight of water is from about 0.5 to about 5%.

5. The process of claim 1 wherein step A) is carried out at a temperature in the range of from about 60° C. to about 90° C.

6. The process of claim 5 wherein step A) is carried out at a temperature in the range of from about 65° C. to about 75° C.

7. The process of claim 1 wherein the polyol is a polyethylene glycol having an average molecular weight of from about 200 to about 2000 or a mixture of said polyethylene glycol and polypropylene glycol having an average molecular weight of from about 400 to about 1000.

8. The process of claim 1 wherein step E) is carried out at a temperature in the range of from about 40° C. to about 100° C.

9. The process of claim 8 wherein said temperature is in the range of from about 60° to about 90° C.

10. The process of claim 1 wherein step E) is terminated by adding an acid to the reaction mixture.

11. The process of claim 1 wherein in step E) the amine is a mono-, di-, and/or polyamine.

12. In a process for the preparation of polyether polyamines comprising reacting a polyol with an epihalohydrin in the presence of a catalyst, followed by reaction of the resulting bishalohydrin with ammonia and/or an amine, the improvement wherein after the reaction of the polyol with the epihalohydrin and before reaction of the bishalohydrin with ammonia and/or an amine, in at least equimolar quantity, based on the quantity of catalyst used, of alkali metal hydroxide in the from of an aqueous solution is added to the reaction mixture, the volatile constituents therein are then removed from the reaction mixture by distillation at a temperature below about 150° C. and under a pressure below about $1.33 \times 10^4$ Pa., and the reaction mixture is subsequently filtered at a temperature in the range of from about 80° C. to about 100° C.

13. The process of claim 12 wherein distillation is carried out at a temperature in the range of from about 110° C. to about 130° C. and at a pressure below about $0.67 \times 10^4$ Pa.

14. The process of claim 12 wherein from about 0.2 to about 10% by weight of water, based on the weight of water, based on the weight of the reaction mixture, is added to the reaction mixture prior to distillation of the volatile constituents.

15. The process of claim 14 wherein from about 0.5 to about 5% by weight of water is added to the reaction mixture.

* * * * *